United States Patent [19]

Bich

[11] Patent Number: 4,742,671
[45] Date of Patent: May 10, 1988

[54] CROP HARVESTING MACHINE BASE UNIT LIFT MECHANISM PROVIDING AUXILIARY HEIGHT BOOST TO CROP GATHERING ATTACHMENT

[75] Inventor: Gary L. Bich, New Holland, Pa.
[73] Assignee: New Holland Inc., New Holland, Pa.
[21] Appl. No.: 86,456
[22] Filed: Aug. 17, 1987
[51] Int. Cl.⁴ ............................................. A01D 34/04
[52] U.S. Cl. ..................................... 56/15.9; 56/15.6; 56/208
[58] Field of Search ........................ 56/208, 15.9, 15.8, 56/15.6, 16.1, 16.2, 16.3, 364, DIG. 9; 172/273 X, 272, 680; 414/723

[56] References Cited

U.S. PATENT DOCUMENTS

| | | | |
|---|---|---|---|
| Re. 30,056 | 7/1979 | Halls | 56/15.8 |
| 3,355,865 | 12/1967 | Waldrop | 56/16.1 |
| 3,822,534 | 7/1974 | Martin | 56/15.8 |
| 4,085,571 | 4/1978 | Mortier et al. | 56/208 |
| 4,236,369 | 12/1980 | Decoene | 56/60 |
| 4,280,317 | 7/1981 | Lindblom | 56/208 |
| 4,300,726 | 11/1981 | Phillips et al. | 241/101.7 |
| 4,313,294 | 2/1982 | Martenas | 56/15.8 |
| 4,473,993 | 10/1984 | Jennings et al. | 56/208 |

FOREIGN PATENT DOCUMENTS 139198 12/1979 Denmark ............................ 56/15.9

Primary Examiner—John Weiss
Attorney, Agent, or Firm—John R. Flanagan; Frank A. Seemar; Larry W. Miller

[57] ABSTRACT

A crop harvesting machine has a crop gathering attachment lift mechanism which includes a pair of lift assemblies and a pair of actuators. Each lift assembly includes a lift arm and a boost arm. The lift arm is pivotally mounted to the base unit and pivotally connectable to the attachment. Pivoting of the lift arm causes raising of the attachment from its lowered position to a partially raised position being located at a height between its fully raised position and its lowered position. The boost arm is pivotally connected to the lift arm and has a roller rotatably mounted thereon for making rolling contact engagement with an arcuate cam structure on the attachment. The boost arm also is pivotally connected to the actuator. The actuator can be operated to initially cause the aforementioned pivoting of the lift arm to raise the attachment from its lowered to partially raised position and to thereafter cause pivoting of the boost arm relative to the lift arm to pivot the attachment relative to the lift arm and thereby raise the attachment from its partially raised to fully raised position. The use of the boost arm gives an auxiliary boost in the height to which the attachment can be lifted above the height which can be attained by the use of the lift arm alone.

11 Claims, 2 Drawing Sheets

CROP HARVESTING MACHINE BASE UNIT LIFT MECHANISM PROVIDING AUXILIARY HEIGHT BOOST TO CROP GATHERING ATTACHMENT

BACKGROUND OF THE INVENTION

1. Field of the Invention

The present invention relates generally to crop harvesting machines and, more particularly, is concerned with a lift mechanism on a crop harvesting machine base unit which provides an auxiliary height boost to a crop gathering attachment mounted by the lift mechanism to the base unit in pivotally moving the attachment from its lowered operating position to its raised non-operating position.

2. Description of the Prior Art

Various types of crop harvesting machines typically employ crop gathering headers or attachments for delivering crop material from a field to crop material reducing elements of the machines. For example, a forage harvester for preparing forage from stalk crops, such as corn and sorghum, normally comprises a base unit having a chopping mechanism, and a crop gathering attachment which cuts the crop from the field and conveys it to the chopping mechanism. The chopped crop is then blown into a trailing wagon in which it is transported to a storage facility.

The crop gathering attachment is typically mounted at the front of the base unit for pivotal movement vertically between a lowered operating position and a raised non-operating or transport position. Some type of lift mechanism is generally pivotally mounted on the front of the base unit which, in turn, supports the attachment. The lift mechanism commonly includes an attachment support frame pivotally mounted to the base unit and an actuator which is operable to angularly displace the support frame about its pivot relative to the base unit to move the attachment vertically between the operating and nonoperating positions. Representative of the prior art are the attachment lift mechanisms disclosed in Decoene, U.S. Pat. No. 4,236,369; and Martenas, U.S. Pat. No. 4,313,294; which patents are assigned to the assignee of the present invention.

The crop gathering attachment lift mechanisms of these patents work reasonably well and generally achieve their objectives under the range of operating conditions for which they were designed. However, a need has arisen for a lift mechanism which will pivotally raise the crop gathering attachment to a height greater than can be achieved with either of the mechanisms disclosed in the above-cited patents.

SUMMARY OF THE INVENTION

The present invention provides a crop gathering attachment lift mechanism designed to satisfy the aforementioned needs. The lift mechanism of the present invention provides an auxiliary boost in the height of the crop gathering attachment when in the raised position over that provided by the cited prior art lift mechanisms. For example, the maximum angle which can be achieved by the lift mechanism of the present invention between the field and a line extending from the point of contact of the base unit front wheels with the field to the bottom of the crop gathering attachment when in its fully raised position is approximately twenty degrees compared to only thirteen degrees achieved by the prior art lift mechanism of the Martenas patent.

Accordingly, the present invention is directed to a lift mechanism in a crop harvesting machine having a base unit. The lift mechanism supports a crop gathering attachment and is operable for raising and lowering the attachment relative to the base unit. The lift mechanism comprises: (a) at least one lift assembly for interconnecting the attachment to the base unit; and (b) at least one actuator coupled between the base unit and the lift assembly and being operable to actuate the lift assembly for raising and lowering the crop gathering attachment relative to the base unit between a fully raised position and a lowered position.

More particularly, the lift assembly includes (i) a lift arm and (ii) a boost arm. The lift arm is mounted to the base unit for pivotal movement relative thereto and is pivotally connectable to the crop gathering attachment. Selected pivotal movement of the lift arm relative to the base unit causes raising of the attachment, when pivotally connected to the lift arm, from the lowered position to a partially raised position being located at a height between the fully raised position and the lowered position of the attachment.

Additionally, the boost arm is connected to the lift arm for pivotal movement relative thereto. The boost arm also is engaged with the crop gathering attachment for relative movable contact therewith and is pivotally connected to the actuator. The actuator can be operated to initially cause the pivotal movement of the lift arm relative to the base unit to raise the attachment from the lowered position to the partially raised position and to thereafter causes pivotal movement of the boost arm relative to the lift arm to pivot the attachment relative to the lift arm and thereby raise the attachment from the partially raised position to the fully raised position.

The boost arm preferably has a cam roller rotatably mounted thereon for providing rolling contact engagement with an arcuate cam surface on the attachment when the attachment is pivotally connected to the lift arm. The provision of the boost arm in conjunction with the lift arm allows an auxiliary boost in the height to which the attachment can be lifted above the height which can attained by the lift arm alone.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward", "left", "upwardly", etc., are words of convenience and are not to be construed as limiting terms.

Prior Art Crop Gathering Attachment Lift Mechanism

Figure 1:
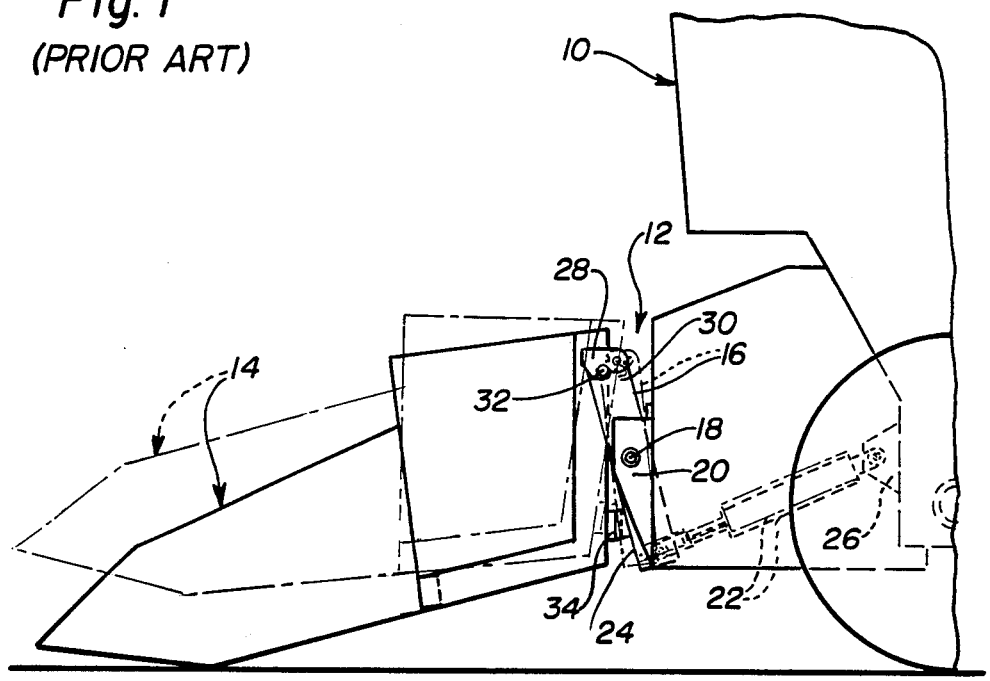
FIG. 1 is a partial side elevational view of a crop harvesting machine showing its crop gathering attachment being supported by a prior art lift mechanism constructed substantially as disclosed in the above-cited Martenas U.S. Pat. No. 4,313,294.

Referring now to the drawings, and particularly to FIG. 1, there is shown a mobile base unit 10 of a prior art crop harvesting machine, such as a forage harvester, having a lift mechanism 12 for supporting a crop gathering attachment 14 at the front of the base unit 10. (The forward left side of the machine is shown when one is standing to the rear of the machine and facing in the direction of forward travel.) The lift mechanism 12 includes a pair of lift arms 16 laterally spaced from one another and pivotally mounted at 18 intermediate their opposite ends to pairs of brackets 20 fixed adjacent to opposite sides of the base unit 10 and extending forwardly therefrom. Only the one lift arm 16 and one pair of brackets 20 located adjacent to the left side of the front of the base unit 10 is shown in FIG. 1 and described hereafter.

Additionally, a generally fore-and-aft extending actuator 22 is pivotally mounted at its forward end to the lower end 24 of each lift arm 16 and at its rear end to another bracket 26 fixed to the base unit 10. The actuator 22, which can take the form of a hydraulic cylinder, is extendible and retractable for rotating its associated one of the lift arms 16 in clockwise and counter-clockwise directions about pivot 18 to cause lifting (or raising) and lowering of the crop gathering attachment 14 between raised and lowered positions, being respectively shown in phantom and solid line forms in FIG. 1. The attachment 14 is generally placed in its raised position during periods of non-operation when tranport of the machine is desired. Conversely, the attachment 14 is placed in its lowered position for field operation wherein it will "float" along the field surface.

Lifting of the crop gathering attachment 14 by the lift arms 16 is accomplished by, first, rotatably connecting latches 28 on the upper ends 30 of the lift arms 16 about pins 32 on the upper side portions of the rear of the attachment 14. (Only one latch 28 and one pin 32 are shown in FIG. 1.) Next, the actuators 22 are extended to rotate the lift arms 16 clockwise to bring their lower portions into contact with stops 34 fixed on the rear of the attachment 14. Finally, continued extension of the actuators 22 causes continued clockwise rotation of the lift arms 16 and initiates lifting of the attachment 14 from the solid line lowered position to the phantom line raised position seen in FIG. 1.

It should be observed that once the lower portions of the lift arms 16 are brought into abutment with the fixed stops 34 on the crop gathering attachment 14, no relative movement between the lift arms 16 and the attachment 14 can occur thereafter. Therefore, movement of the crop gathering attachment 14 between its lowered and raised positions and thus the height the attachment 14 can attain above the field is limited by the extent to which the lift arms 16 can be rotatably moved about their pivots 18. Due to the necessity of positioning the rear of the attachment 14 close to a crop chopping mechanism (not shown) mounted in the front portion of the base unit 10, the extent to which the lift arms 16 can be allowed to rotate is restricted.

Crop Gathering Attachment Lift Mechanism of Present Invention

Figure 2:
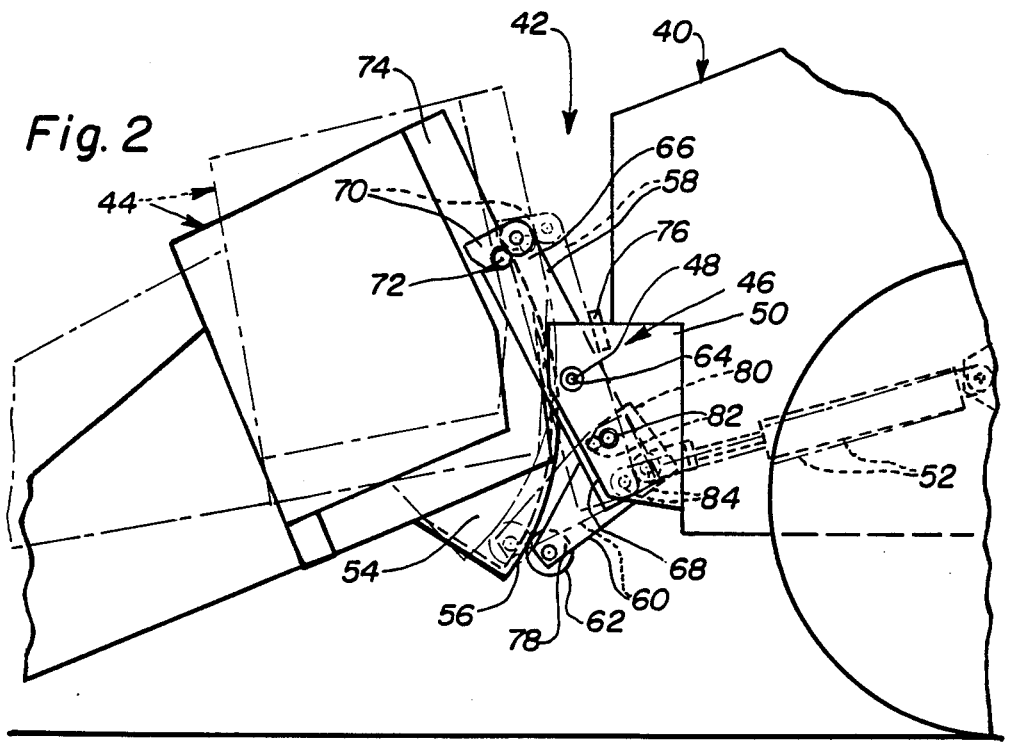
FIG. 2 is a partial side elevational view of a crop harvesting machine showing its crop gathering attachment being supported by a lift mechanism constructed in accordance with the principles of the present invention.
Figure 3:
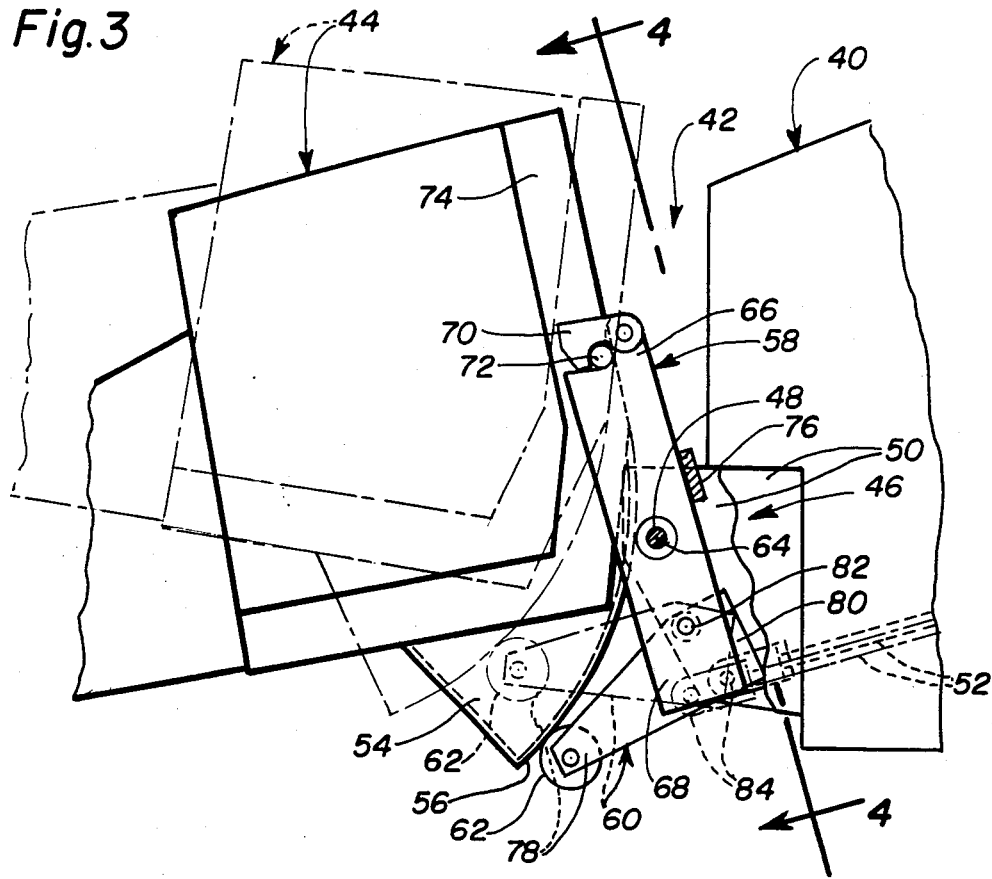
FIG. 3 is another partial side elevational view similiar to that of FIG. 2, but on an enlarged scale with portions of the lift mechanism broken away and with the crop gathering attachment being supported at a different angular position by the lift mechanism.
Figure 4:
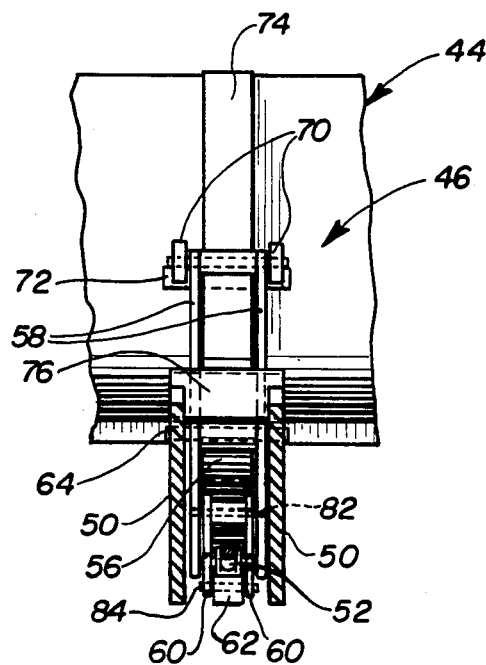
FIG. 4 is an enlarged rear view, partly in sectional form, of one of the lift arm assemblies of the lift mechanism as seen along line 4—4 of FIG. 3.

Referring now to FIGS. 2-4, there is shown a mobile base unit 40 of a crop harvesting machine, such as a forage harvester, having a lift mechanism 42 for supporting a crop gathering attachment 44 at the front of the base unit 40. The lift mechanism 42 is constructed and operates in accordance with the principles of the present invention. (The forward left side of the machine is shown when one is standing to the rear of the machine and facing in the direction of forward travel.)

More particularly, the lift mechanism 42 includes a pair of lift assemblies 46 laterally spaced from one another and pivotally mounted at 48 to pairs of brackets 50 fixed adjacent to opposite sides of the base unit 40 and extending forwardly therefrom. The lift assemblies 46 are adapted for supporting the attachment 44 on the front of the base unit 40. Also, the lift mechanism 42 includes a pair of actuators 52, preferably in the form of extendable and retractable hydraulic cylinders, being coupled between the base unit 40 and the respective lift assemblies 46. The actuators 52 are operable upon respective extension and retraction thereof to actuate the lift assemblies 46 for correspondingly raising and lowering the attachment 44 relative to the base unit 40 between a fully raised position, as shown in dashed line form in FIG. 3, and a fully lowered position, as shown in solid line form in FIG. 3. Finally, the lift mechanism 42 includes a pair of structures 54 mounted on the underside of the attachment 44 in laterally spaced relation from one another which define arcuate cam surfaces 56 aligned with the lift assemblies 46 for making moving contact engagement therewith to raise and lower the attachment 44.

Only one lift assembly 46 and one pair of brackets 50 located adjacent to the left side of the front of the base unit 40, and one arcuate cam structure 54 located adjacent the left side of the attachment 44 are illustrated in FIG. 2-4. Since these illustrated components are identical to those not shown which are located adjacent to the right sides of the base unit 40 and the attachment 44, description of the illustrated components will be sufficient for purposes of understanding the present invention. As will be explained below, the construction and arrangement of the lift assemblies 46 of the lift mechanism 42 of the present invention allows an auxiliary boost in the height above the field to which the crop gathering attachment 42 can be lifted over the height attainable by the prior art lift mechanism of FIG. 1 when used alone.

Turning now specifically to the lift assemblies 46 of the lift mechanism 42, each lift assembly 46 in its basic components includes a lift arm 58 comprising a pair of opposing walls, a boost arm 60 comprising a pair of opposing walls and a cam roller 62. The cam roller 62 is preferably composed of cast iron.

The lift arm 58 of the lift assembly 46 is mounted to the base unit 40 for pivotal movement relative thereto in a fore-and-aft vertical plane by a transverse pivot pin 64 rotatably connected to the pair of brackets 50 fixed to the front of the base unit 40 and projecting forwardly therefrom. The pivot pin 64 pivotally mounts the lift arm 58 generally intermediately between opposite upper and lower end portions 66,68 of the lift arm. Each lift arm 58 has a spring-loaded latch 70 rotatably mounted on its upper end portion 66 by which the lift arm 58 can be pivotally connected about a pin 72 on a structural member 74 adjacent each side of the attachment 44 and aligned with the lift arm 58. The latch 70 is biased for counterclockwise rotation, as viewed in FIG. 2, to maintain the attachment 44 pivotally connected to the lift arm 58 during raising and lower thereof.

Selected pivotal movement of the lift arm 58 in a clockwise direction relative to the base unit 40, until the lift arm 58 contacts a stop 76 attached transversely across the brackets 50 rearwardly of the lift arm, causes raising of the attachment 44 from the lowered position, shown in solid line form in FIG. 2, to a partially raised position, shown in dashed line form in FIG. 2 or in solid line form in FIG. 3. In the partially raised position, the attachment 44 is located at a height between the heights of the attachment at its fully raised and lowered positions. Of course, opposite counterclockwise movement of the lift arm 58 relative to the base unit 40 results in lowering of the attachment 44 from its partially raised to fully lowered position.

The boost arm 60 of the lift assembly 46 has forward and rear end portions 78,80. The boost arm on its forward end portion rotatably mounts the cam roller 62 for making rolling engagement with the arcuate cam surface 56 on the structure 54 being attached to the structural member 74 of the attachment 44. Also, the boost arm 60 at a first location on its rear end portion 80 is pivotally connected to the lift arm 58 at the lower end portion 68 thereof for pivotal movement relative thereto in a fore-and-aft vertical plane by a transverse pivot pin 82. At a second location on its rear end portion 80 displaced below the first location thereon, the boost arm 60 is pivotally connected by pivot pin 84 to one of the actuators 52. Extension and retraction of the actuator 52 can cause pivoting of the boost arm 60 in respective clockwise and counterclockwise directions relative to the lift arm 58.

Particularly, extension of the actuator 52 initially causes forward thrust of the boost arm 60 which, in turn, causes the aforementioned clockwise pivotal movement of the lift arm 58 (for the solid line to dashed line positions in FIG. 2), relative to the base unit 40 until the lift arm 58 contacts the stop 76. Such pivoting of the lift arm 58 raises the attachment 44 from its solid line lowered position to its dashed line partially raised position in FIG. 2. Once the lift arm 58 engages the stop 76, continued extension of the actuator 52 thereafter causes clockwise pivotal movement (about pivot pin 82) of the boost arm 60 relative to the lift arm 58 and relative rolling engagement of the boost arm roller 62 with the attachment cam surface 56 to initiate clockwise pivoting (about pin 72) of the attachment 44 relative to the lift arm 58 and thereby raising of the attachment 44 from its solid line partially raised position to its dashed line fully raised position, as seen in FIG. 3. It is thus seen how use of the boost arm 60 thereby allows an auxiliary boost in the height to which the attachment 44 can be lifted above the height which can attained by the lift arm 58 alone.

It is thought that the crop gathering attachment lift mechanism of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In a crop harvesting machine having a base unit, a lift mechanism for supporting a crop gathering attachment and being operable for raising and lowering said attachment relative to said base unit, said lift mechanism comprising:
   (a) at least one lift assembly for interconnecting said attachment and said base unit; and
   (b) at least one actuator coupled between said base unit and said lift assembly and being operable to actuate said lift assembly for raising and lowering said attachment relative to said base unit between a fully raised position and a lowered position;
   (c) said lift assembly including
      (i) a lift arm being mounted to said base unit for pivotal movement relative thereto and being pivotally connectable to said attachment such that selected pivotal movement of said lift arm relative to said base unit causes raising of said attachment, when pivotally connected to said lift arm, from said lowered position to a partially raised position being located at a height between said fully raised position and said lowered position of said attachment, and
      (ii) a boost arm being connected to said lift arm for pivotal movement relative thereto, engageable with said crop gathering attachment for making moving contact therewith and pivotally connected to said actuator such that said actuator can be operated to initially cause said pivotal movement of said lift arm relative to said base unit to raise said attachment from said lowered position to said partially raised position and to thereafter cause pivotal movement of said boost arm relative to said lift arm to pivot said attachment relative to said lift arm and thereby raise said attachment from said partially raised position to said fully raised position, the provision of said boost arm thereby allowing an auxiliary boost in the height to which said attachment can be lifted above the height which can be attained by said lift arm alone.

2. The machine as recited in claim 1, wherein said lift assembly includes a roller mounted on said boost arm for making said moving contact with said attachment.

3. The machine as recited in claim 1, wherein said lift arm is pivotally mounted to said base unit generally between opposite upper and lower end portions of said lift arm and is pivotally connectable to said attachment at said upper end portion of said lift arm.

4. The machine as recited in claim 3, wherein said boost arm has forward and rear end portions, said boost arm at a first location on its rear end portion being pivotally connected to said lift arm at said lower end thereof, said boost arm at a second location on its rear end portion spaced below said first location thereon being pivotally connected to said actuator.

5. The machine as recited in claim 4, wherein said boost arm on its forward end portion has a roller rotatably mounted thereon for making said moving contact with said attachment.

6. In a crop harvesting machine having a base unit and a crop gathering attachment, a lift mechanism for supporting said attachment and being operable for raising and lowering said attachment relative to said base unit, said lift mechanism comprising:
   (a) at least one lift assembly for interconnecting said attachment and said base unit; and
   (b) at least one actuator coupled between said base unit and said lift assembly and being operable to actuate said lift assembly for raising and lowering said crop gathering attachment relative to said base unit between a fully raised position and a fully lowered position;
   (c) said lift assembly including
      (i) a lift arm being mounted to said base unit for pivotal movement relative thereto and being pivotally connected to said attachment such that selected pivotal movement of said lift arm relative to said base unit causes raising of said attachment from said lowered position to a partially raised position being located at a height between said fully raised position and said lowered position of said attachment,
      (ii) a roller, and
      (iii) a boost arm rotatably mounting said roller for making rolling engagement with said attachment, said boost arm also being connected to said lift arm for pivotal movement relative thereto and being pivotally connected to said actuator such that said actuator can be operated to initially cause said pivotal movement of said lift arm, and said boost arm therewith, relative to said base unit to raise said attachment from said lowered position to said partially raised position and to thereafter cause pivotal movement of said boost arm relative to said lift arm to pivot said attachment relative to said lift arm and thereby raise said attachment from said partially raised position to said fully raised position, the provision of said boost arm thereby allowing an auxiliary boost in the height to which said attachment can be lifted above the height which can attained by said lift arm alone.

7. The machine as recited in claim 6, wherein said lift assembly includes an arcuate cam structure on said attachment for engagement by said roller.

8. The machine as recited in claim 6, wherein said lift arm is pivotally mounted to said base unit generally between opposite upper and lower end portions of said lift arm and is pivotally connected to said attachment at said upper end portion of said lift arm.

9. The machine as recited in claim 8, wherein said boost arm has forward and rear end portions, said boost arm at a first location on its rear end portion being pivotally connected to said lift arm at said lower end thereof, said boost arm at a second location on its rear end portion spaced below said first location thereon being pivotally connected to said actuator.

10. The machine as recited in claim 9, wherein said roller is rotatably mounted on said forward end portion of said boost arm for making said moving contact with said attachment.

11. In a crop harvesting machine having a base unit and a crop gathering attachment, a lift mechanism for supporting said attachment and being operable for raising and lowering said attachment relative to said base unit, said lift mechanism comprising:
   (a) at least a pair of lift assemblies laterally spaced from one another and disposed adjacent opposite sides of said base unit and extending forwardly therefrom, said lift assemblies for interconnecting said attachment and said base unit; and
   (b) at least a pair of actuators, each actuator coupled between said base unit and one of said lift assemblies and being operable to actuate said lift assemblies for raising and lowering said attachment relative to said base unit between a fully raised position and a fully lowered position; and
   (c) at least a pair of arcuate cam surfaces disposed on said attachment in laterally spaced relation from one another in alignment with said lift assemblies;
   (d) said each lift assembly including
      (i) a lift arm being pivotally mounted to said base unit generally intermediate opposite upper and lower end portions of said arm for pivotal movement relative thereto and being pivotally connected to said attachment at said upper end portion of said arm such that selected pivotal movement of said lift arm relative to said base unit causes raising of said attachment from said lowered position to a partially raised position being located at a height between said fully raised position and said lowered position of said attachment,
      (ii) a roller, and
      (iii) a boost arm having forward and rear end portions, said boost arm on its forward end portion rotatably mounting said roller for making rolling engagement with one of said arcuate cam surfaces on said attachment, said boost arm at a first location on its rear end portion being pivotally connected to said lift arm at said lower end portion thereof for pivotal movement relative thereto and at a second location on its rear end portion being pivotally connected to one of said actuators, said second location being displaced below said first location such that said actuator can be operated to initially cause said pivotal movement of said lift arm, and said boost arm therewith, relative to said base unit to raise said attachment from said lowered position to said partially raised position and to thereafter cause pivotal movement of said boost arm relative to said lift arm and relative rolling engagement between said boost arm roller and said attachment cam surface to pivot said attachment relative to said lift arm and thereby raise said attachment from said partially raised position to said fully raised position, the provision of said boost arm thereby allowing an auxiliary boost in the height to which said attachment can be lifted above the height which can be attained by said lift arm alone.

* * * * *